United States Patent [19]

Takatori

[11] Patent Number: 5,265,821
[45] Date of Patent: Nov. 30, 1993

[54] PHOTOGRAPHIC FILM CASSETTE

[75] Inventor: Tetsuya Takatori, Kanagawa, Japan

[73] Assignee: Fuji Photo Film Co. Ltd., Kanagawa, Japan

[21] Appl. No.: 831,016

[22] Filed: Feb. 4, 1992

[30] Foreign Application Priority Data

Feb. 4, 1991 [JP] Japan ................................. 3-035733

[51] Int. Cl.$^5$ ............................................. G03B 17/26
[52] U.S. Cl. .................................. 242/71.1; 354/275; 242/71.9
[58] Field of Search .................... 242/71.1, 71.9, 71.8; 354/275

[56] References Cited

U.S. PATENT DOCUMENTS

| | | | |
|---|---|---|---|
| 4,846,418 | 7/1989 | Fairman | 242/71.1 |
| 4,887,776 | 12/1989 | Niedospial, Jr. et al. | 242/71.1 |
| 4,962,401 | 11/1990 | Takahashi | 242/71.1 X |
| 5,031,855 | 7/1991 | Wolf et al. | 242/71.1 |
| 5,040,739 | 8/1991 | Wolf et al. | 242/71.1 |
| 5,083,721 | 1/1992 | Okutsu et al. | 242/71.1 |

Primary Examiner—John M. Jillions
Attorney, Agent, or Firm—Sughrue, Mion, Zinn, Macpeak & Seas

[57] ABSTRACT

A photographic film cassette has first and second molded spool pieces respectively molded integrally. The first spool piece includes a first core, a first flange, a circumferential lip and cam grooves, whereas the second spool piece includes a second core, a second flange and cam followers. When the first spool piece is rotated in the unwinding direction, the second spool piece is slid in the initial stage of the rotation. The spool is changed from a lengthened state where the flanges are widely spaced to a shortened state where the flanges are less widely spaced. After assuming the shortened state, the first and second spool pieces are kept integral so as to rotate together with a roll of photographic film. A film leader is separated by a separating claw so as to advance to the outside of the cassette shell.

17 Claims, 7 Drawing Sheets

FIG. 7

| | CAM FOLLOWERS | CAM GROOVES | RING | FLAT FLANGE | LIPPED FLANGE |
|---|---|---|---|---|---|
| TRAILER ANCHOR | X | X | A | X | B |
| LIPPED FLANGE | B | X | X | A | |
| FLAT FLANGE | X | X | X | | |
| RING | X | X | | | |
| CAM GROOVES | A | | | | |

A: NECESSARY TO BE SEPERATELY MOLDED
B: DEFFICULT TO BE INTEGRALLY MOLDED
X: EASY TO BE INTEGRALLY MOLDED

PHOTOGRAPHIC FILM CASSETTE

BACKGROUND OF THE INVENTION

1. Field of the Invention

The present invention relates to a photographic film cassette. More particularly, the present invention is an improvement of a spool of a film cassette in which rotation of the spool causes a photographic film leader to advance to the outside of a cassette shell.

2. Description of the Related Art

A known photographic film cassette includes a photographic filmstrip (hereinafter referred to as film) positioned so that the film leader does not protrude from the cassette shell prior to loading the cassette in a camera. Such a cassette is easily loaded into a camera. Simple film-advancing mechanisms of the camera are typically used with this type of cassette and include a construction which rotates a spool to unwind the film, thereby causing the leader to move through a film passageway and exit from the cassette.

In the above-mentioned type of film cassette, the roll of film wound on the spool is prevented from loosening, when the spool is rotated, in order to transmit the rotation of the spool to the leader. In a cassette as disclosed in U.S. Pat. Nos. 4,846,418 and 4,887,776, the spool has a pair of spool pieces slidable relative to each other. A first spool piece is provided with a first flange and a cam follower, whereas the second spool piece is provided with a second flange, which is flat, and a cam groove formed to receive the cam follower. When the spool pieces are rotated relative to one another, the cam follower is guided along the cam groove so as to shorten the interval between both flanges by sliding the spool pieces axially relative to one another. The first flange is provided with a circumferential lip which projects from around its peripheral edge so as to engage with a side of the outermost turn of the roll of film in order to prevent the roll from loosening. When sliding the spool pieces, the outermost turn of the roll is clamped between the flat flange and the inside of the lip of the other flange so that the roll of film is rotatable integrally with the spool and is thus prevented from loosening.

It is, however, difficult to form the first spool piece discussed above. Both the first lipped flange and the cam follower are formed on the first spool piece so as to project from the cylindrical surface of its core. When molding such a spool piece integrally, the cam follower defines an undercut. Such a construction causes excessive complication in an injection molding process used to form the spool. Accordingly, the cam follower for the first spool piece is formed beforehand in a separate manner, such as a pin, which is fixed on the core after welding. Thus, the cost of manufacturing the spool, and thus the cassette, is relatively high.

SUMMARY OF THE INVENTION

In view of the foregoing problems, an object of the present invention is to provide a leader-advancing photographic film cassette having a spool which can be manufactured in a simplified and inexpensive manner.

In order to achieve the above and other objects and advantages of this invention, the spool is separated into first and second molded spool pieces. The first spool piece includes a first core, a first flange, a circumferential lip and a cam groove formed integrally therewith. The second spool piece includes a second core, a second flange and a cam follower formed integrally therewith. The lip projects from a peripheral edge of the first flange toward a roll of photographic film. The second core is coupled with the first core in a rotatable and slidable manner. The cam follower is received in the cam groove so as to cause the spool to change from a lengthened to a shortened state when the first and second spool pieces are rotated relatively. In the shortened state, lateral edges of an outermost turn of the roll are tightly clamped between the second flange and the lip so as to rotate the roll of film integrally with the spool without allowing the roll to loosen.

Because the cam follower is formed integrally with the second spool piece and the circumferential lip is formed integrally with the first spool piece, the process for manufacturing the spool pieces is facilitated so that an inexpensive film cassette can be provided.

BRIEF DESCRIPTION OF THE DRAWINGS

The above objects and advantages of the present invention will become more apparent from the following detailed description when read in connection with the accompanying drawings, in which:

FIG. 7 is a table relating to FIG. 6; and

DETAILED DESCRIPTION OF THE PREFERRED EMBODIMENTS

Figure 1:
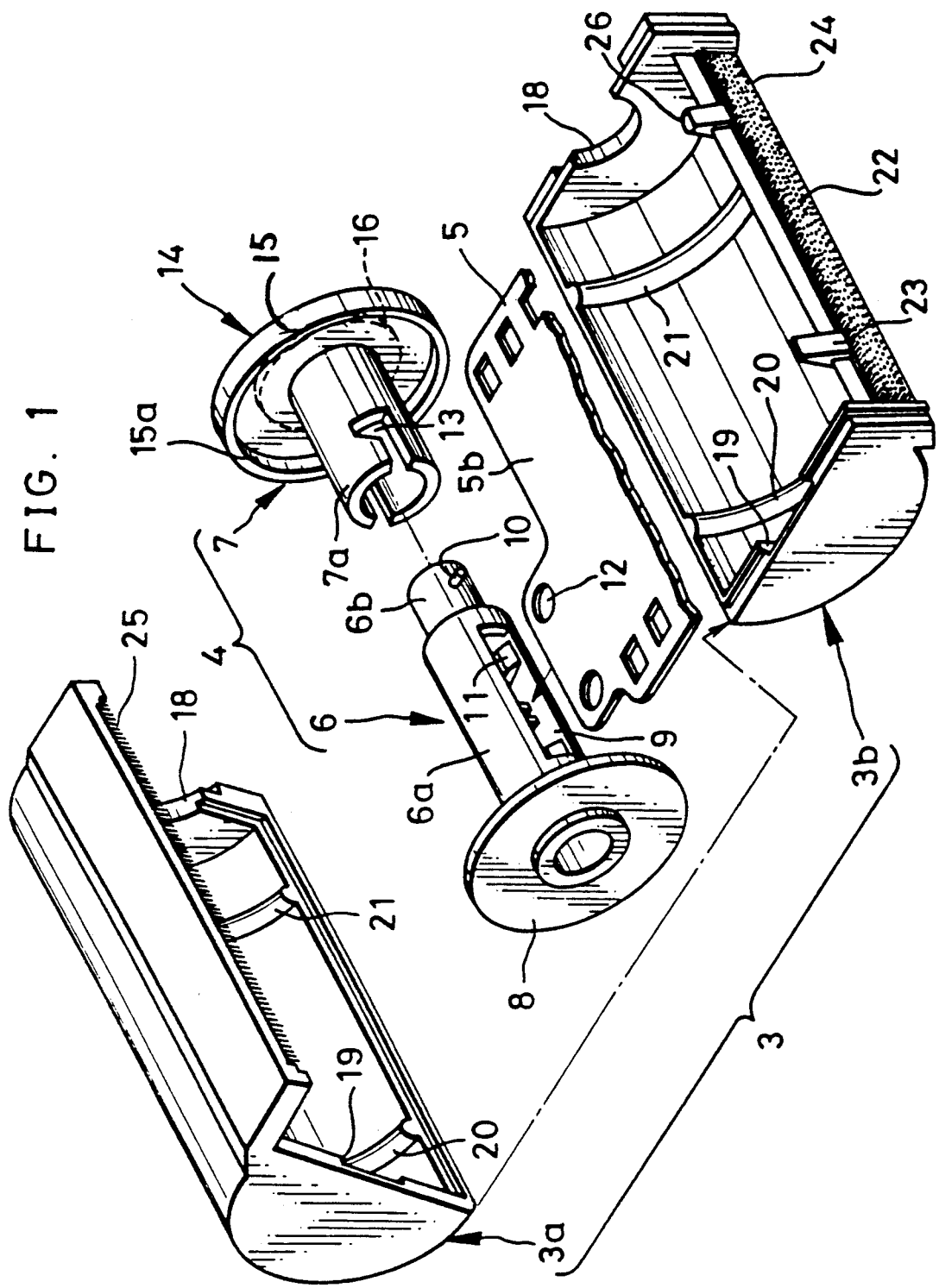
FIG. 1 is an exploded perspective view illustrating a photographic film cassette according to a first preferred embodiment of the present invention.

FIGS. 1-4 illustrate the first preferred embodiment. Film cassette 2 is constituted of a cassette shell 3, a spool 4 to be contained in the cassette shell 3 and a photographic film 5, wound on the spool 4 in the form of a roll. The cassette shell 3 consists of a pair of shell halves 3a and 3b. The spool 4 is constituted of a pair of spool pieces 6 and 7 connected together so that their axes coincide. Each of the spool pieces 6 and 7 is integrally molded from resin. The inner spool piece 6 has a flat flange 8, a core 6a, and a rod 6b having a diameter smaller than the core 6a and adapted to be inserted in a hollow portion formed in the outer spool piece 7. A slit 9 is formed in the core 6a for receiving a trailer 5b of the film 5. A trailer anchoring structure having a pair of engaging claws 11 is formed in the slit 9. The engaging claws 11 are engaged with a pair of holes 12 formed in the trailer 5b so as to anchor the film 5 in the core 6a of the inner spool piece 6. A pair of cam followers 10 are formed on the rod 6b so as to be engaged with cam grooves which are described below.

Figure 2:
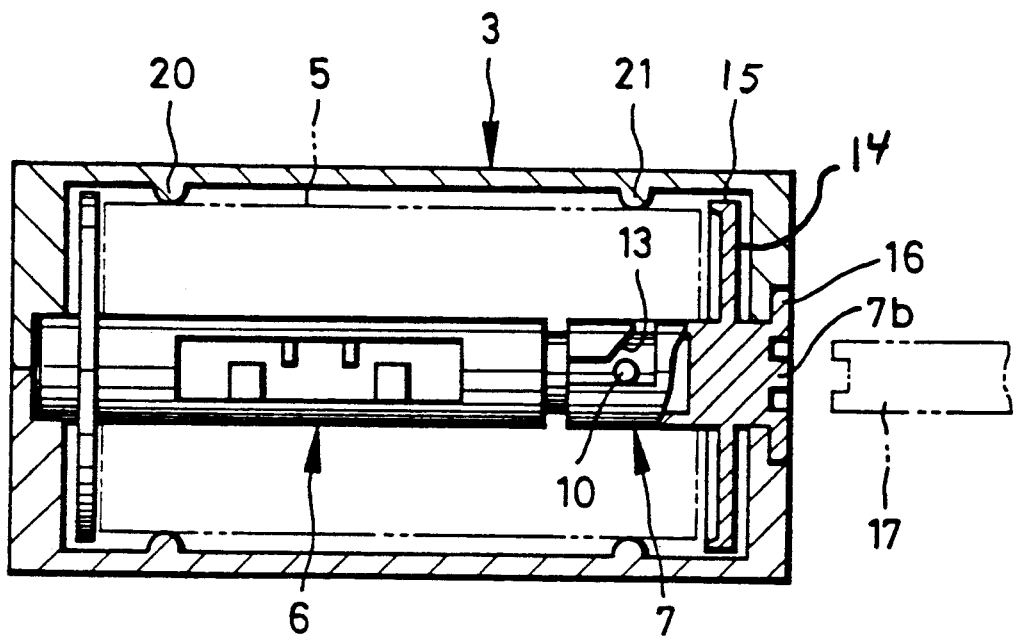
FIG. 2 is a vertical section illustrating the cassette illustrated in FIG. 1 in a state where a roll of film is free from the flanges.
Figure 3:
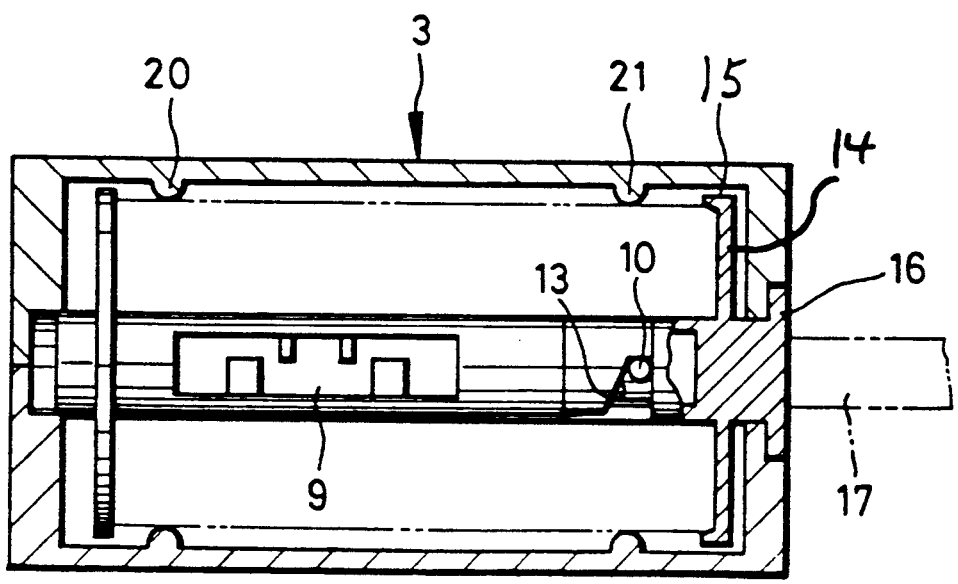
FIG. 3 is a vertical section illustrating the cassette illustrated in FIG. 1 in a state where the roll is clamped between the flanges.
Figure 4:
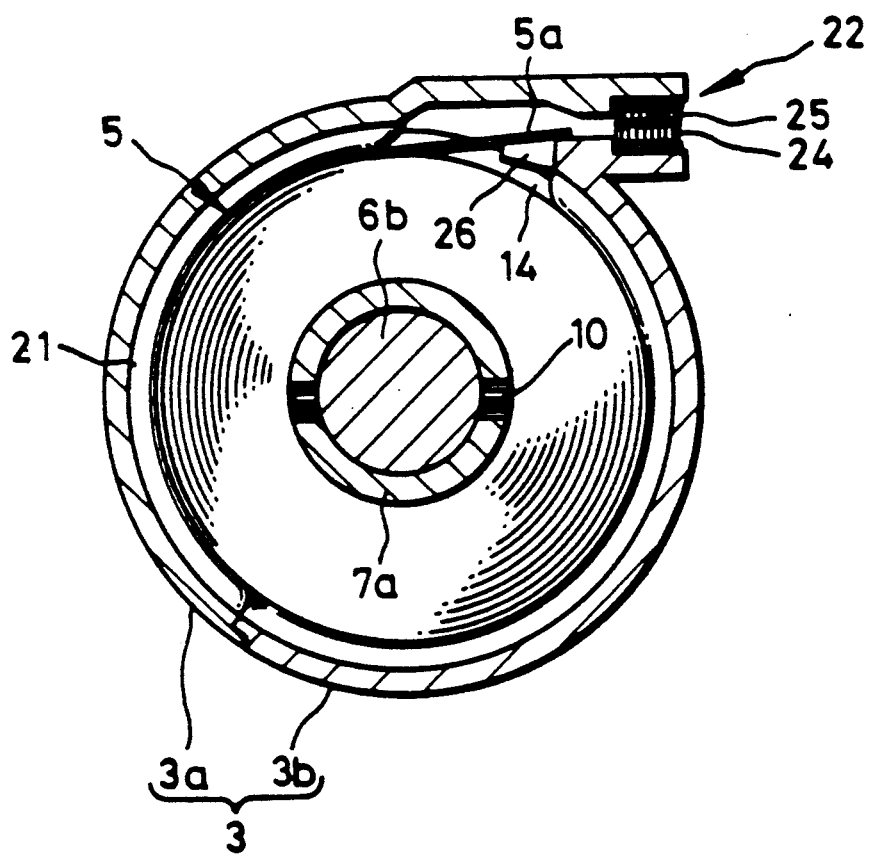
FIG. 4 is a cross section illustrating the cassette illustrated in FIG. 1.
Figure 5:
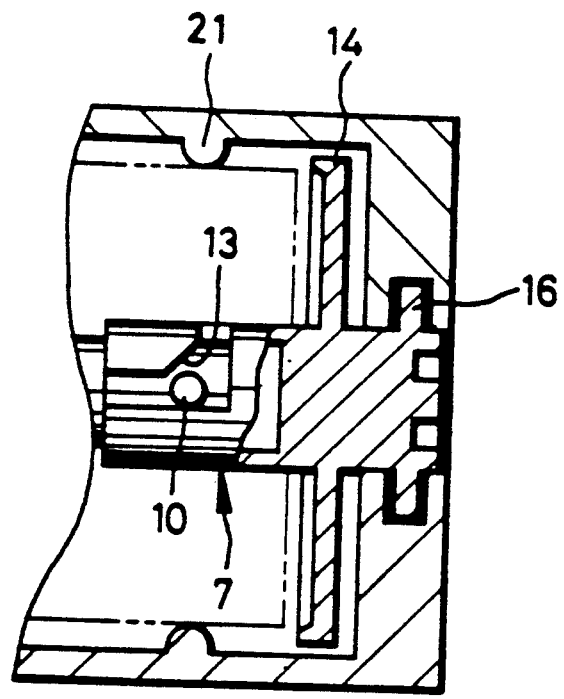
FIG. 5 is a section illustrating an important portion of a cassette according to a second preferred embodiment of the present invention.

The outer spool piece 7 is also provided with a core 7a, which has a hollow portion into which the rod 6b is inserted. A pair of cam grooves 13 and a flange 14 are formed on the core 7a. The cam grooves 13 are adapted to receive the cam followers 10, whereas the flange 14 is provided with a circumferential lip 14 formed along its peripheral edge. The lip 15 has an inclined contact surface 15a which is contact with the right side of the outermost turn of the roll of film 5, and prevents the roll from loosening as well as limiting the range of sliding of the core 7a axially with respect to core 6a. Around the distal end of the core 7a is formed a ring 16 in a position outward from the lipped flange 14. The ring 16 has a diameter larger than the core 7a, and prevents light from being incident on the film 5 through a bearing hole 18 which supports the spool 4 in the shell 3. An engaging projection 7b is formed on the distal end of the core 7a as illustrated in FIG. 2, and is adapted to be engaged with a fork 17 incorporated in a camera as indicated by the two-dot-dash lines in FIGS. 2 and 3. The distal end of the core 6a of the spool piece 6 is covered inside the cassette shell 3, and rotatably supported in a recess 19 formed on the left-hand inside wall of the cassette shell 3. Although the ring 16 is exposed outside the cassette shell 3 in the present embodiment, it may be enclosed in the lateral wall of the cassette shell 3 as illustrated in FIG. 5, so that the light-shielding effect of the ring 16 is improved. The sum of the clearance defined between the ring 16 and the lateral wall and that defined between the lipped flange 14 and the lateral wall is naturally constant.

A pair of annular ridges 20 and 21 are formed on the cylindrical inside of the cassette shell 3 so as to be in contact with the outermost turn of the roll of film 5 to keep the diameter of the roll small enough to be clamped within the lip 15, and to reduce a friction between the roll and the inside of the cassette shell 3 during a film advancement by minimizing the contact surface between the outermost turn of film and the shell 3. The ridges 20 and 21 also provide an auxiliary effect of preventing the roll from loosening. A passage mouth 22, for passage of the film 5, is defined by shell halves 3a and 3b. A separating claw 23 is formed on the lower shell half 3b, which is also provided with a guiding projection 26 connected to the ridge 21. The separating claw 23 abuts on a leading end 5a of the film 5, separates it from the inner roll of film 5, and guides it to the passage mouth 22. The projection 26 assists the separating claw 23 by also directing the leader 5a to the passage mouth 22. A pair of light-trapping fabric pieces, or plush, 24 and 25, are disposed in the passage mouth 22 in order to prevent light from entering the film chamber through the passage mouth 22.

The operation of the cassette 2 will now be described. When it is loaded in the camera, the projection 7b is engaged with the fork 17. Film-advancing mechanisms of the camera rotate the fork 17 in the direction to unwind the film, and thus the core 7a is rotated clockwise in FIG. 1. Rotation of the core 7a causes inclined edges along the cam grooves 13 to press the cam followers 10 so as to advance the rod 6b further into the core 7a. Accordingly, the outermost turn of the roll is clamped by the flat flange 8 and the inclined surface 15a of the lip 15. The core 6a is rotated in the direction of unwinding the film 5 so that the roll is held integrally with both spool pieces 6 and 7. The outermost turn of the roll thus integrally follows the movement of the spool 4. While the roll is rotated together with the spool 4, the leading end 5a abuts on the separating claw 23. The left side of the leader 5a is free from the lip 15, so that the leading end 5a is separated from the inner roll by the separating claw 23.

Further rotation of the outer spool piece 7 then causes the leader 5a advance to the outside of the cassette shell 3 through the passage mouth 22. The left side of the leader 5a is flexed by contact with the lip 15 while escaping therefrom during the leader advancement. It is noted that a spreader may be formed in the cassette shell 3 in a position opposite the passage mouth 22 so as to slightly spread the lip 15 in order to facilitate the escape of the leader 5a from the lip 15. The projection 26 may also be formed to act as such a spreader.

Figure 6:
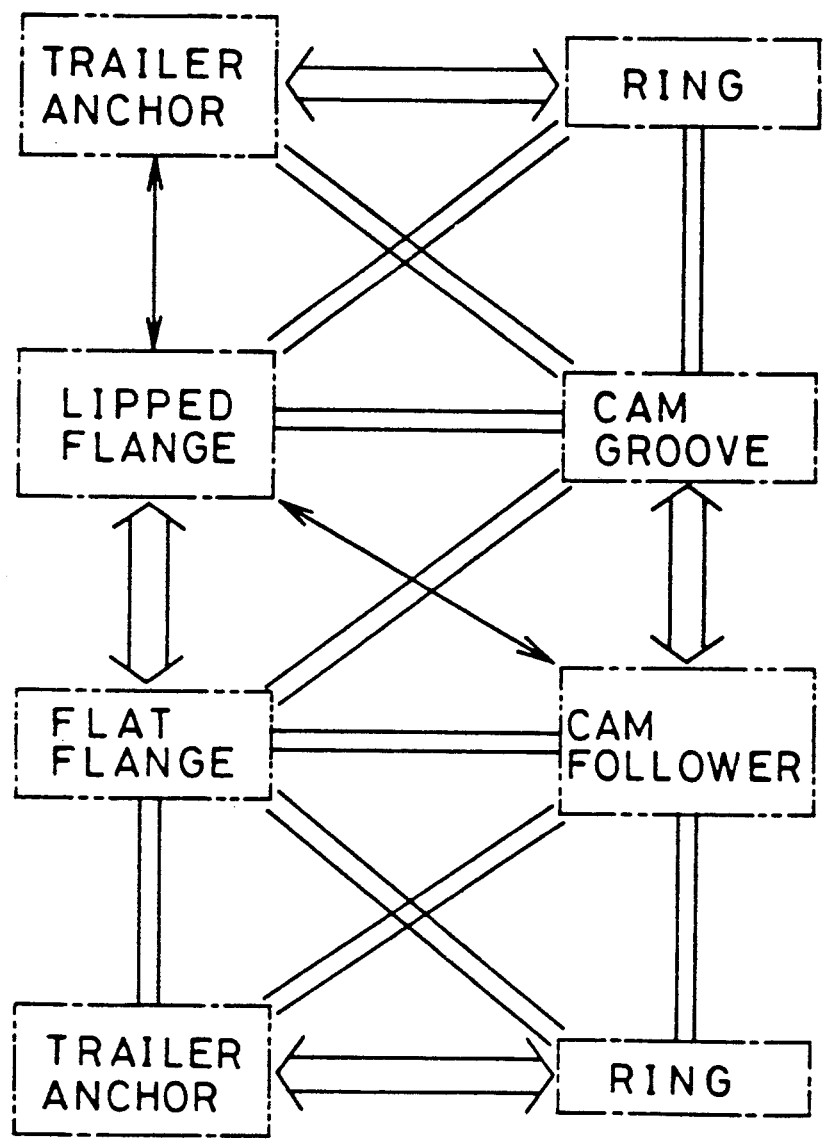
FIG. 6 is an explanatory diagram illustrating degrees of facility in integrally molding two of six relevant structures included in the spool.

FIGS. 6 and 7 illustrate the facility in integrally molding two of the six relevant structures consisting of the shortenable spool 4. In FIG. 6, the arrows of double solid lines indicate the necessity for molding the two structures on both sides of the arrows separately, i.e., the necessity for molding the two with the opposite spool pieces 6 and 7. This same characteristic is indicated with an "A" in FIG. 7. In other words, the film anchoring structure needs to be separated from the ring 16; the flat flange 8 from the lipped flange 14; and the cam followers 10 from the cam grooves 13.

The arrows of a single solid line in FIG. 6 indicate a difficulty in integrally molding two structures on both sides of the arrows, i.e., there is an advantage in molding these structures integrally with the opposite spool pieces 6 and 7. Such a relationship is indicated with a "B" in FIG. 7. In other words, the film anchoring structure should be separated from the lipped flange 14, and the cam followers 10 from the lipped flange 14.

In FIG. 6, the double solid lines indicate a facility in integrally molding two structures on both sides of the double lines with one common spool piece. This is indicated with an "X" in FIG. 7. In the present cassette, the spool piece 6 is provided with the flat flange 8, the trailer anchoring structure and the cam follower 10 molded integrally thereon. Such a structure is indicated with the framing lines of the two-dot-dash lines. The opposite spool piece 7 is provided with the cam groove 13, the lipped flange 14, and the ring 16 molded integrally thereon, which is also indicated with the framing line of the one-dot-dash lines. Therefore, the difficulty in molding conventional spool pieces is overcome in the present invention.

Figure 8:
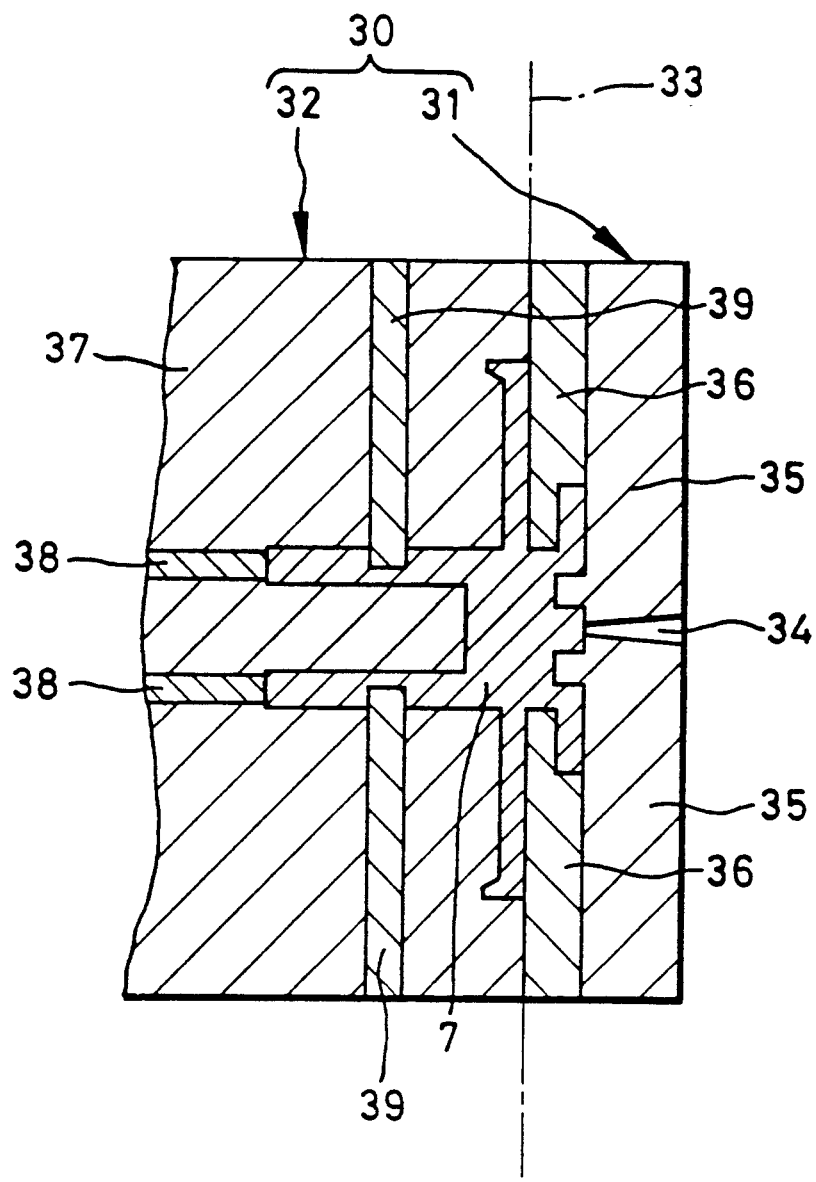
FIG. 8 is a sectional view illustrating a mold assembly for molding an outer spool piece.

FIG. 8 illustrates a mold assembly 30 for molding the outer spool piece 7. The mold assembly 30 consists of a stationary mold 31 and a movable mold 32 which is movable leftward in FIG. 8. The dot-dash line 33 in the drawing indicates a parting line between the molds 31 and 32. The stationary mold 31 is constituted of a base plate 35 having a gate 34, and a pair of slide cores 36 slidable vertically for forming the ring 16. The movable mold 32 is constituted of a base plate 37, knockout pins 38 movable horizontally, and a pair of slide cores 39 slidable vertically for forming the cam grooves 13. When the resin injected through the gate 34 is cooled within the mold assembly 30, the slide cores 36 are moved vertically apart from the resin. The movable mold 32 moves leftward. Then the slide cores 39 are moved vertically apart. The knockout pins 38 are moved rightward. The outer spool piece 7 is therefore ejected from the mold assembly 30 smoothly, because the outer spool piece 7 lacks an undercut as would be defined by a cam follower.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic film cassette having a spool with a photographic film wound thereon in a roll, said spool being rotatably contained in a cassette shell, a leader of said film is separated by a separating claw from said roll of film when said spool is rotated in an unwinding direction, and said leader is caused to advance to an outside of said cassette shell through a film passage mouth, comprising:

first and second molded spool pieces each being supported by said cassette shell respectively;
   said first spool piece includes a first core, a first flange, a circumferential lip and a cam groove formed integrally therewith, said lip projecting from a peripheral edge of said first flange toward said roll; and
   said second spool piece includes a second core, a flat second flange and a cam follower formed integrally therewith;
   said second core being coupled with said first core in a rotatable and slidable manner, said cam follower being engaged with said cam groove so as to change said spool between lengthened and shortened states when said first and second spool pieces are rotated relatively, said lateral edges of an outermost turn of said roll are tightly clamped between said second flange and said lip so as to prevent said roll from loosening when said spool is in said shortened state.

2. A photographic film cassette as claimed in claim 1, wherein said cassette shell is constructed from a pair of resinous shell halves.

3. A photographic film cassette as claimed in claim 2, wherein said cam follower is engaged with said cam groove so that when said first spool piece is initially rotated in an unwinding direction said spool piece changes from said lengthened state where said first and second flanges are spaced a first distance apart to said shortened state where said first and second flanges are spaced a second distance apart which is less than said first distance, and subsequently, said first and second spool pieces rotate integrally with each other while maintaining said shortened state.

4. A photographic film cassette as claimed in claim 3, wherein:

said first core has a first end supported by said cassette shell and a second end in which said cam groove is formed; and
   said second core has a third end supported by said cassette shell and a fourth end fitted on said second end, said cam follower being formed on said fourth end.

5. A photographic film cassette having a spool with a photographic film wound thereon in a roll, said spool being rotatably contained in a cassette shell, a leader of said film is separated by a separating claw from said roll of film when said spool is rotated in an unwinding direction, and said leader is caused to advance to an outside of said cassette shell through a film passage mouth, comprising:

first and second molded spool pieces each being supported by said cassette shell respectively;
   said first spool piece includes a first core, a first flange, a circumferential lip and a cam groove formed integrally therewith, said lip projecting from a peripheral edge of said first flange toward said roll, said first core has a first end supported by said cassette shell and a hollow cylindrical second end in which said cam groove is formed;
   said second spool piece includes a second core, a flat second flange and a cam follower formed integrally therewith, said second core has a third end supported by said cassette shell and a fourth end, which is a rod, fitted on said second end, said cam follower being formed on said fourth end; and
   said cam follower being engaged with said cam groove so as to change said spool between lengthened and shortened states when said first and second spool pieces are rotated relatively, said lateral edges of an outermost turn of said roll are tightly clamped between said second flange and said lip so as to prevent said roll from loosening when said spool is in said shortened state.

6. A photographic film cassette having a spool with a photographic film wound thereon in a roll, said spool being rotatably contained in a cassette shell, a leader of said film is separated by a separating claw from said roll of film when said spool is rotated in an unwinding direction, and said leader is caused to advance to an outside of said cassette shell through a film passage mouth, comprising:

first and second molded spool pieces each being supported by said cassette shell respectively;
   said first spool piece includes a first core, a first flange, a circumferential lip and a cam groove formed integrally therewith, said lip projecting from a peripheral edge of said first flange toward said roll, said first core has a first end supported by said cassette shell and a second end in which said cam groove is formed, said first end extending through a first lateral wall of said cassette shell so as to be selectively coupled to an external rotary member;
   said second spool piece includes a second core, a flat second flange and a cam follower formed integrally therewith, said second core has a third end supported by said cassette shell and a fourth end fitted on said second end, said cam follower being formed on said fourth end, said third end being covered by a second lateral wall of said cassette shell; and
   said second end being coupled with said fourth end in a rotatable and slidable manner, said cam follower being engaged with said cam groove so as to change said spool between lengthened and shortened states when said first and second spool pieces are rotated relatively, said lateral edges of an outermost turn of said roll are tightly clamped between said second flange and said lip so as to prevent said roll from loosening when said spool is in said shortened state.

7. A photographic film cassette as claimed in claim 6, wherein said third end is rotatably fitted in a recess formed in said second lateral wall on an inside surface thereof.

8. A photographic film cassette as claimed in claim 7, wherein said first end is inserted through a hole formed in said first lateral wall.

9. A photographic film cassette as claimed in claim 8, wherein a ring is formed on said first end so as to shield light from entering said cassette shell and so as to limit axial sliding of said first spool piece relative to said cassette shell.

10. A photographic film cassette as claimed in claim 9, wherein said ring is fitted rotatably in a recess formed in an outside surface of said first lateral wall.

11. A photographic film cassette as claimed in claim 9, wherein said ring is fitted in an annular groove formed in said first lateral wall.

12. A photographic film cassette as claimed in claim 9, wherein a trailer of said film is anchored on said second core.

13. A photographic film cassette as claimed in claim 12, further comprising:
   a slit formed in said second core, between said second flange and said fourth end, so as to receive said trailer; and
   an anchoring device provided in said slit so as to anchor said trailer on an inside surface of said slit.

14. A photographic film cassette as claimed in claim 13, further comprising:
   annular ridges formed on an inside surface of said cassette shell on two lateral sides so as to contact an outer cylindrical surface of said roll.

15. A photographic film cassette as claimed in claim 14, wherein said separating claw is disposed in a position proximate said second flange with reference to a lengthwise direction of said cassette shell.

16. A photographic film cassette as claimed in claim 15, wherein said lip is provided with an inclined surface formed on a portion thereof which is in opposition to said roll of film.

17. A photographic film cassette having a spool with a photographic film wound thereon in a roll, said spool being rotatably contained in a cassette shell, a leader of said film is separated by a separating claw from said roll of film when said spool is rotated in an unwinding direction, and said leader is caused to advance to an outside of said cassette shell through a film passage mouth, comprising:
   first and second molded spool pieces each being supported by said cassette shell respectively;
   said first spool piece includes a first core, a first flange, a circumferential lip and a cam groove formed integrally therewith, said lip projecting from a peripheral edge of said first flange toward said roll, said first core has a first end supported by said cassette shell and a second end in which said cam groove is formed;
   said second spool piece includes a second core, a flat second flange and a cam follower formed integrally therewith, said second core has a third end supported by said cassette shell and a fourth end fitted on said second end, said cam follower being formed on a narrowed portion defined on said fourth end, a distal end of said cam follower being contained within a maximum radius of said second core; and
   said second end being coupled with said fourth end in a rotatable and slidable manner, said cam follower being engaged with said cam groove so as to change said spool between lengthened and shortened states when said first and second spool pieces are rotated relatively, said lateral edges of an outermost turn of said roll are tightly clamped between said second flange and said lip so as to prevent said roll from loosening when said spool is in said shortened state.

* * * * *